(12) United States Patent
Nakao et al.

(10) Patent No.: US 8,223,388 B2
(45) Date of Patent: Jul. 17, 2012

(54) IMAGE DATA PROCESSOR AND IMAGE DATA PROCESSING PROGRAM STORAGE MEDIUM

(75) Inventors: Mitsuru Nakao, Kanagawa (JP); Nobuyuki Shitara, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 509 days.

(21) Appl. No.: 12/556,920

(22) Filed: Sep. 10, 2009

(65) Prior Publication Data
US 2010/0296118 A1    Nov. 25, 2010

(30) Foreign Application Priority Data
Sep. 11, 2008   (JP) .................................. 2008-233339

(51) Int. Cl.
*G06K 15/00*   (2006.01)
(52) U.S. Cl. ....................... 358/1.18; 358/1.13; 358/1.15
(58) Field of Classification Search ........................ None
See application file for complete search history.

(56) References Cited

U.S. PATENT DOCUMENTS

| | | | |
|---|---|---|---|
| 2003/0020956 A1* | 1/2003 | Goel et al. | 358/1.18 |
| 2005/0046878 A1* | 3/2005 | Kido | 358/1.2 |
| 2008/0198416 A1* | 8/2008 | Wiegand et al. | 358/1.18 |
| 2009/0213406 A1* | 8/2009 | Kimura | 358/1.13 |
| 2009/0225369 A1* | 9/2009 | Gordon et al. | 358/1.18 |

FOREIGN PATENT DOCUMENTS

JP    2005-210-483    8/2005

* cited by examiner

*Primary Examiner* — Twyler Haskins
*Assistant Examiner* — Lennin Rodriguez
(74) *Attorney, Agent, or Firm* — Young & Thompson

(57) ABSTRACT

It is judged whether or not impositioning is applied to an image, based on layout information. If the image is the imposed one, layout information (storage layout information) for each page constituting one impositioning and output joint information for impositioning based on the storage layout information are generated. A page raster for each page constituting an imposed image is saved without duplication.

12 Claims, 15 Drawing Sheets

FIG. 3

| OBJECT ID | X-POSITION | Y-POSITION | REUSABLE |
|---|---|---|---|
| M-TH (ODD NUMBER) SHEET LAYOUT | | | |
| V(2M-1) | XV1 | YV1 | × |
| V(2M) | XV2 | YV2 | × |
| RC | XRC | YRC | ○ |
| R(a)T | XRrT | YRrT | ○ |
| R(a)L | XRrL | YRrL | ○ |
| RS | XRrS | YRrS | ○ |
| N-TH (EVEN NUMBER) SHEET LAYOUT | | | |
| R(b)T | XR1T | YR1T | ○ |
| R(b)L | XR1L | YR1L | ○ |
| RS | XR1S | YR1S | ○ |
| R(c)T | XRrT | YRrT | ○ |
| R(c)L | XRrL | YRrL | ○ |
| RS | XRrS | YRrS | ○ |

| OBJECT ID | X-POSITION | Y-POSITION | REUSABLE |
|---|---|---|---|
| FIRST SHEET LAYOUT | | | |
| V1 | XV1 | YV1 | × |
| V2 | XV2 | YV2 | × |
| RC | XRC | YRC | ○ |
| R1T | XRrT | YRrT | ○ |
| R1L | XRrL | YRrL | ○ |
| RS | XRrS | YRrS | ○ |
| SECOND SHEET LAYOUT | | | |
| R2T | XR1T | YR1T | ○ |
| R2L | XR1L | YR1L | ○ |
| RS | XR1S | YR1S | ○ |
| R3T | XRrT | YRrT | ○ |
| R3L | XRrL | YRrL | ○ |
| RS | XRrS | YRrS | ○ |

IMAGE DATA PROCESSOR AND IMAGE DATA PROCESSING PROGRAM STORAGE MEDIUM

BACKGROUND OF THE INVENTION

1. Field of the Invention

The present invention relates to an image data processor for generating a page raster that is image data in a rasterized format by each page based on page description data described in page description language for variable printing, and an image data processing program storage medium storing an image data processing program that causes an information processing apparatus to operate as the image data processor.

2. Description of the Related Art

For example, there have been variable printing in which a variable object that is an image object used only once on a particular page is combined with a reusable object that is an image object used repeatedly over plural pages. One application of the variable printing is, for example, an advertisement addressed to a different individual name but contents of which is almost the same, for example, formed by picture patterns.

As variable printing has large data volume due to its abundant variation in printing, how to decrease data amount, speed up processing and suppress the amount of data storage capacity raise a problem.

Here, it should be noted that there has been proposed a technique in which, when plate data for variable printing is generated from layout information that has already been generated in the previous processing using merging processing of an object data, the same plate data is reused without merging the relevant image (see Japanese Patent Laid-Open No. 2005-210483). For example, if a plate data C for the third page is found to be same as a plate data C for the first page that has already been generated, the first-page plate data C is to be sent to a printer as the third-page plate data C.

Generally, variable printing has a structure most of which is formed by adding a small number of variable objects to almost same page layouts. Recently, there has been increasing number of jobs in which one set is formed by plural pages. An example taken here is a pamphlet for merchandise classified by customers that has four pages as one set: the first page is formed by variable data representing customers; the second page to the fourth page are reusable pages selected according to customers' taste from twenty kinds of prepared pages introducing merchandise. Each variable job is formed by 999 sets for 999 customers.

A printing operator tends to print on a sheet as large as possible to suppress cost of paper and printing. For example, if the page size in the above example is A4 size, they impose two pages of A4 size on an A3 sized sheet and cut it into two in the subsequent processing.

In the case of a job described above, if, in A4-size printing, twenty kinds of reusable pages and one variable page out of four pages are generated, the already prepared print data (i.e., approx. 75% of the total) can be used for the remaining pages, which leads to high productivity. However, if two pages are imposed on a sheet, the number of combinations for arranging the right half and the left half of a sheet is as much as 400. This reduces the ratio in which the same objects are arranged in the same position of a sheet. Thus, a reuse ratio is decreased (to approx. 30% of the total).

SUMMARY OF THE INVENTION

The present invention has been made in view of the above circumstances and provides an image data processor that is capable of securing a high ratio of reusing generated raster data for a variable job even with impositioning similarly to a case without impositioning and of decreasing storage data amount, and an image data processing program storage medium that causes an information processing apparatus to operate as the image data processor.

According to a first aspect of the invention, there is provided an image data processor including:

a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having arrangement positions by each page of the image objects specified by the page description data;

a rasterizing section that receives the object data generated in the data analyzing section and rasterizes each image object in the object data, thereby generates an object raster that is object data in a rasterized format of each image object;

a layout analyzing and processing section that performs:

impositioning judgment processing in which it is judged if there is an image object to be arranged crossing an impositioning border, based on the layout information generated in the data analyzing section, and thereby the number of pages constituting one impositioning is judged;

storage layout information generation processing in which a layout for each page constituting the layout information is broken into as many storage page layouts as the number of pages constituting one impositioning, said number of pages being judged by the impositioning judgment processing, based on the layout information generated in the data analyzing section, and thereby storage layout information formed by storage page layouts for all the pages is generated; and output joint information generation processing in which each storage page layout constituting the storage layout information that is generated by the storage layout information generation processing is recorded for the number of pages constituting one impositioning, said number of pages being judged by the impositioning judgment processing, according to a layout for each page constituting the layout information generated in the data analyzing section, output page joint information representing an image same as an image indicated by the layout for each page constituting the layout information is generated for all the pages, and thereby output joint information formed by the output page joint information for all the pages is generated;

an assembling section that assembles each object raster generated in the rasterizing section, based on the storage layout information generated in the layout analyzing and processing section, for each storage page layout constituting the storage layout information, thereby generating a storage page raster representing a rasterized image in a manner to avoid generation of the same storage page raster; and an output raster joint section that joins storage page rasters generated in the assembling section based on the output joint information by each output page joint information constituting the output joint information, thereby generating an output page raster representing a rasterized image by each output page.

The image data processor according to the present invention judges whether or not impositioning is applied to an image, based on layout information. If the image is the imposed one, layout information (storage layout information) for each page constituting an imposed image and output joint information for impositioning based on the storage layout information are generated, and a page raster for each page constituting an imposed image is saved without duplication. This significantly reduces data amount to be saved.

In the image data processor, it is preferable that the layout analyzing and processing section generates storage layout information defining a page size for one page that is formed by dividing a page size defined in the layout information generated in the data analyzing section, by the number of pages constituting one impositioning that is judged by the impositioning judgment processing.

According to the present invention, a storage page raster is generated for each page constituting one impositioning. Thus, it is preferable that storage layout information defines a page size constituting one impositioning.

In the image data processor, it is also preferable that the layout analyzing and processing section changes, based on each page layout constituting the layout information generated in the data analyzing section, an arrangement position of an image for one page constituting one impositioning represented by each storage page layout constituting the storage layout information so that the changed arrangement position represents an image same as an image represented by each page layout constituting the layout information, records the storage page layout for the number of pages constituting one impositioning that is judged by the impositioning judgment processing, and thereby generates the output page joint information.

If a storage page raster has a page size for one page constituting one impositioning, and output page joint information has each storage page raster that is arranged at the same position as the original impositioning, reproduction of the original layout is enabled.

Preferably, the image data processor further includes an output control section that outputs an output page raster generated in the output raster joint section to a printer that prints a visual image based on the output page raster.

The above feature enables outputting a page raster generated in the image data processor directly to a printer.

According to a second aspect of the invention, there is provided an image data processing program storage medium storing an image data processing program, which is executed in an information processing apparatus and causes the information processing apparatus to operate as an image data processor, the image data processor including:

a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having arrangement positions by each page of the image objects specified by the page description data;

a rasterizing section that receives the object data generated in the data analyzing section and rasterizes each image object in the object data, thereby generates an object raster that is object data in a rasterized format of each image object;

a layout analyzing and processing section that performs:

impositioning judgment processing in which it is judged if there is an image object to be arranged crossing an impositioning border, based on the layout information generated in the data analyzing section, and thereby the number of pages constituting one impositioning is judged;

storage layout information generation processing in which a layout for each page constituting the layout information is broken, based on the layout information generated in the data analyzing section, into as many storage page layouts as the number of pages constituting one impositioning, said number of pages being judged by the impositioning judgment processing, and thereby storage layout information formed by storage page layouts for all the pages is generated; and output joint information generation processing in which each storage page layout constituting the storage layout information that is generated by the storage layout information generation processing is recorded for the number of pages constituting one impositioning, said number of pages being judged by the impositioning judgment processing, according to a layout for each page constituting the layout information generated in the data analyzing section, output page joint information representing an image same as an image indicated by the layout for each page constituting the layout information is generated for all the pages, and thereby output joint information formed by the output page joint information for all the pages is generated;

an assembling section that assembles each object raster generated in the rasterizing section, based on the storage layout information generated in the layout analyzing and processing section, for each storage page layout constituting the storage layout information, thereby generating a storage page raster representing a rasterized image in a manner to avoid generation of the same storage page raster; and an output raster joint section that joins storage page rasters generated in the assembling section based on the output joint information by each output page joint information constituting the output joint information, thereby generating an output page raster representing a rasterized image by each output page.

Also in the image data processing program storage medium, it is preferable that the layout analyzing and processing section generates storage layout information defining a page size for one page that is formed by dividing a page size defined in the layout information generated in the data analyzing section, by the number of pages constituting one impositioning that is judged by the impositioning judgment processing.

Further, in the image data processing program storage medium, it is preferable that the layout analyzing and processing section changes, based on each page layout constituting the layout information generated in the data analyzing section, an arrangement position of an image for one page constituting one impositioning represented by each storage page layout constituting the storage layout information so that the changed arrangement position represents an image same as an image represented by each page layout constituting the layout information, records the storage page layout for the number of pages constituting one impositioning that is judged by the impositioning judgment processing, and thereby generates the output page joint information.

Preferably, the image data processing program storage medium further includes an output control section that outputs an output page raster generated in the output raster joint section to a printer that prints a visual image based on the output page raster.

As described above, the present invention is capable of securing a high ratio of reusing generated raster data also in variable printing with impositioning similarly to a case without impositioning and of decreasing data storage volume significantly.

BRIEF DESCRIPTION OF THE DRAWINGS

FIG. 3 is a drawing indicating layout information of the sample job in FIG. 2;

DETAILED DESCRIPTION

At first, the outline of variable printing processing in the conventional technique including a proposal made in Japanese Patent Laid-Open No. 2005-210483 is briefly described, followed by description of variable printing processing according to the present invention.

Figure 1:
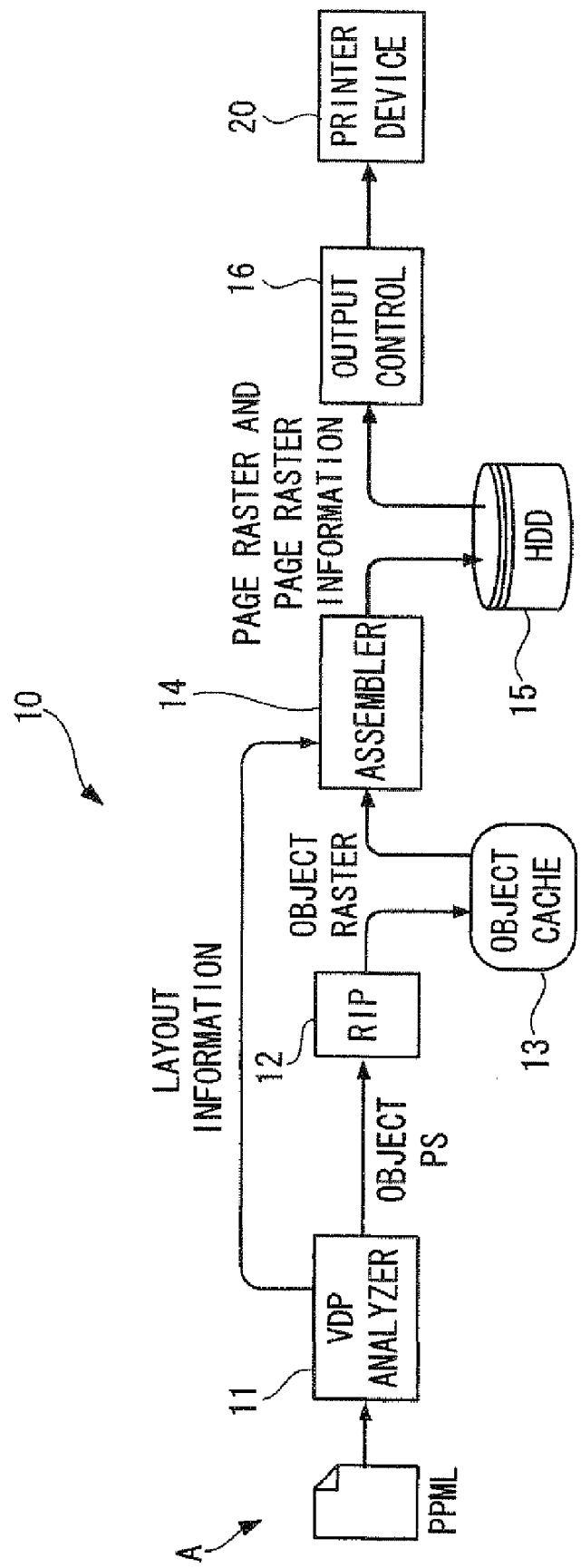
FIG. 1 is a functional block diagram of a conventional image data processor that performs variable print processing.

FIG. 1 is a functional block diagram of a conventional image data processor that performs variable print processing. This type of image data processor has a function realized by combination of the hardware of an information processing apparatus such as a computer and a conventional image data processing program when the conventional image data processing program is executed in the image processing apparatus.

When PPML data A that is described in page description language called as PPML for describing variable printing is input to an image data processor 10, the PPML data A is analyzed in a VDP analyzer 11 at first, to generate layout information and object PS (PostScript).

The layout information describes where in the output page area an object specified by an object ID should be arranged. It is a list of object IDs to be arranged and their arrangement positions by each page.

In addition, the object PS is the one generated as a single postscript file by gathering objects that are included or referred to externally in the PPML.

The object PS generated in the VDP analyzer 11 is input to a RIP (Raster Image Processor) 12 where the object PS is rendered (rasterized) and an object PS that is an image object in a rasterized format is generated. This object raster is once saved in an object cache 13.

In addition, the layout information generated in the VDP analyzer 11 is referred to by an assembler 14. This assembler 14 retrieves from the object cache 13 an object raster specified by an object ID according to description of the layout information and merges the retrieved object raster at a specified position on an output page area. The concept of this "merge" will be described later.

The assembler 14 generates a page raster that is image data in a rasterized format to be sent to a printer device 20, by merging an object raster according to the description of layout information, and also generates page raster information including a file name of a page raster (a pass to the page raster) constituting each page. The generated page raster and the page raster information are saved in a nonvolatile memory section (HDD 15).

When generating a page raster and the page raster information, the assembler 14 examines contents of layout information by each page to find IDs of objects to be arranged on one page and the arrangement positions of the objects. If the page currently being examined has the same object and arrangement position as those on a page previously examined, the page structure of the object and the arrangement of the page previously examined are recorded in page raster information as structure information of the current page, finishing the processing of the current page. On the other hand, if there is no identical object and arrangement position, the assembler 14 reads from the object cache 13 an object raster specified by an object ID according to a description of layout information, merges the read object raster at a specified position, generates a page raster, and saves the page raster in the HDD 15. At the same time, a file name of the page raster saved in the HDD 15 is recorded in page raster information as structure information of the current page.

An output control section 16, according to instruction of a job processing, refers to page raster information and retrieves a page raster from the HDD 15 to send the page raster to the printer device 20 where a printing is performed according to the sent page raster.

It should be noted that details of the VDP analyzer 11 and the RIP 12 are disclosed in Japanese Patent Laid-Open No. 2005-210395.

Figure 2:
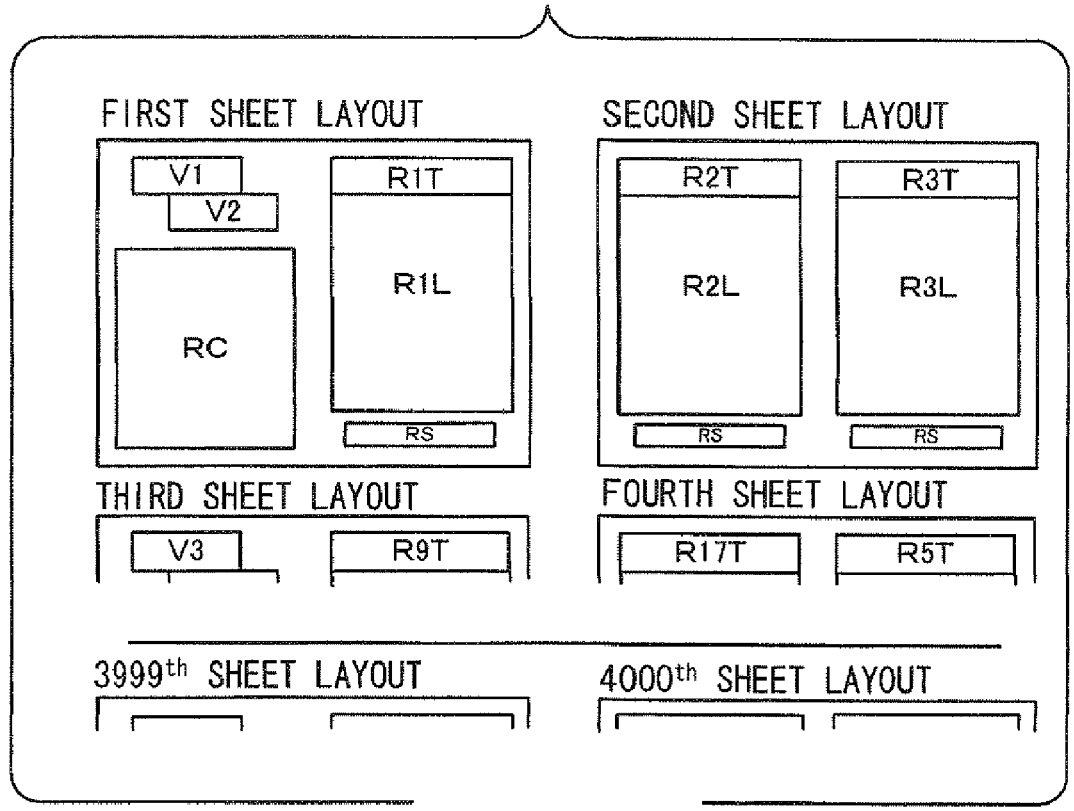
FIG. 2 is a layout chart of a sample job for variable printing.

FIG. 2 is a layout chart of a sample job for variable printing. The sample job indicated in FIG. 2 is the one in which four pages of A4 size form one set and 2000 sets form one job. In the sample indicated in FIG. 2, the first page is formed by reusable objects and variable objects, while the second page to the fourth page are formed by only reusable objects.

Three pages from the second to the fourth page, which are formed only by reusable objects, are apparently randomly sampled from twenty kinds of page layouts and imposed on the respective pages, according to the following rule. This job is input in a PPML data format in which two pages are imposed on an A3-size sheet by the set.

This sample job is based on the assumption that a volume-sale chain store creates direct mails of product advertisement for 2000 customers each of which is differentiated by customers' desire. One direct mail for one customer is formed by four pages: the first page is a front cover for product advertisement with a customer's address and name printed on it;

and the second to fourth pages have a group of products of one category respectively. Twenty kinds of products by each category are prepared beforehand and analyzed according to a customer's taste. The second to fourth pages are edited arranging products by prioritizing a customer's taste. Two pages each in A4 size are imposed on a front side and back side of an A3-size sheet. That is, a total of four pages on the A3 sized sheet are printed, folded, and put in an envelope to be sent by mail.

In the following description, a page before impositioning (A4-size sheet in the embodiment) is referred to as "a page" and an imposed page (A3-size sheet in the embodiment) is referred to as "a sheet" when there is a need to distinguish "the page" from "the sheet." For example, an imposed (A3 size) page that has been described as a page layout and a page raster will be respectively referred to as a sheet layout and a sheet raster in the following description.

However, when there is no need to distinguish "the sheet" from "the page" as in assembling processing (merging processing) by the assembler 14, both the sheet and the page are referred to as a page.

Symbols in the sample job indicated in FIG. 2 represent the following contents.

V1 (variable object): a customer address
V2 (variable object): a customer name
RC (a reusable object): a front cover of one set
R1T, R2T, R3T, R9T, R17T, R5T (reusable objects): head lines of product categories
R1L, R2L, R3L (reusable objects): articles that introduce products
RS (a reusable object): a banner ad that is common to pages for products by category The sample job indicated in FIG. 2 is processed by the VDP analyzer 11. Layout information generated in the VDP analyzer 11 is formed by 4000 sheet layouts in A3 size.

FIG. 3 is a drawing indicating layout information of the sample job in FIG. 2.

For example, object IDs=V1, V2, and RC of the first sheet layout in FIG. 3 are arranged in the left half of the first sheet layout in FIG. 2. Object IDs=R1T, R1L, and RS of the first sheet layout in FIG. 3 are arranged in the right half of the first sheet layout in FIG. 2.

Here, it should be noted that (a), (b), and (c) in R(a)T, R(a)L of the Mth (odd-number) sheet layout and R(b) T, R(b)L, R(c)T, and R(c)L of the Nth (even-number) sheet layout respectively represent any of the numbers among 1 to 20.

Among the variable objects to be arranged on the Mth (odd-number) sheet, the first variable object is placed at the coordinate of (XV1, YV1), and the second variable object is placed at the coordinate of (XV2, YV2). The reusable object RC is always placed at the coordinate of (XRC, YRC).

In both odd-number and even-number sheets, the three reusable objects to be arranged on the left half of a sheet are always placed respectively at the coordinates of (XR1T, YR1T), (XR1L, YR1L) and (XR1S, YR1S) while the three reusable objects to be arranged on the right half of the sheet are always placed respectively at the coordinates of (XRrT, YRrT), (XRrL, YRrL), and (XRrS, YRrS).

Specifically, a positive integer is assigned to an object ID, and a pixel value from the origin of a sheet is described in placement X and placement Y.

An object PS that is generated by processing the sample job in the VDP analyzer 11 described above has a following structure.

Each object has descriptions of reusable objects. Each object ID has description of one RC and one RS. A combination of R1T and R1L through R20T and R20L forms descriptions of forty objects (=40 pages) in 20 kinds.

A variable object is described after all of the reusable objects. A combination of the object IDs V1 through V3999 and the object IDs V2 through V4000 forms descriptions of 4000 objects.

As the object PS describes objects in the order of object IDs, an object raster is saved in the object cache 13 with the serial numbers output from the RIP 12 as object IDs.

Next, descriptions will be made on operation of reusing a raster and merging processing performed by the assembler 14.

In the following description of the assembler 14, a page is used without distinguishing "a page" from "a sheet." However, the size of a page is not limited to A4 size. In addition, processing by the assembler 14 according to the embodiment of the present invention, which will be described later, is performed based on the same algorithm as the processing in the assembler 14.

The assembler 14 confirms reusing of a raster for each page layout of layout information from the first page to the final page. When needed, the assembler 14 repeats assembling processing (generation of a page raster by merging plural object rasters).

Data to be output is formed by page raster information and a page raster. The page raster is generated by page and by CMYK printing and saved in the HDD 15 as a file. Page raster information is generated for each job and a raster file name corresponding to the CMYK print is recorded in outputting order of a page. The page raster information is also saved in the HDD 15.

Figure 4:
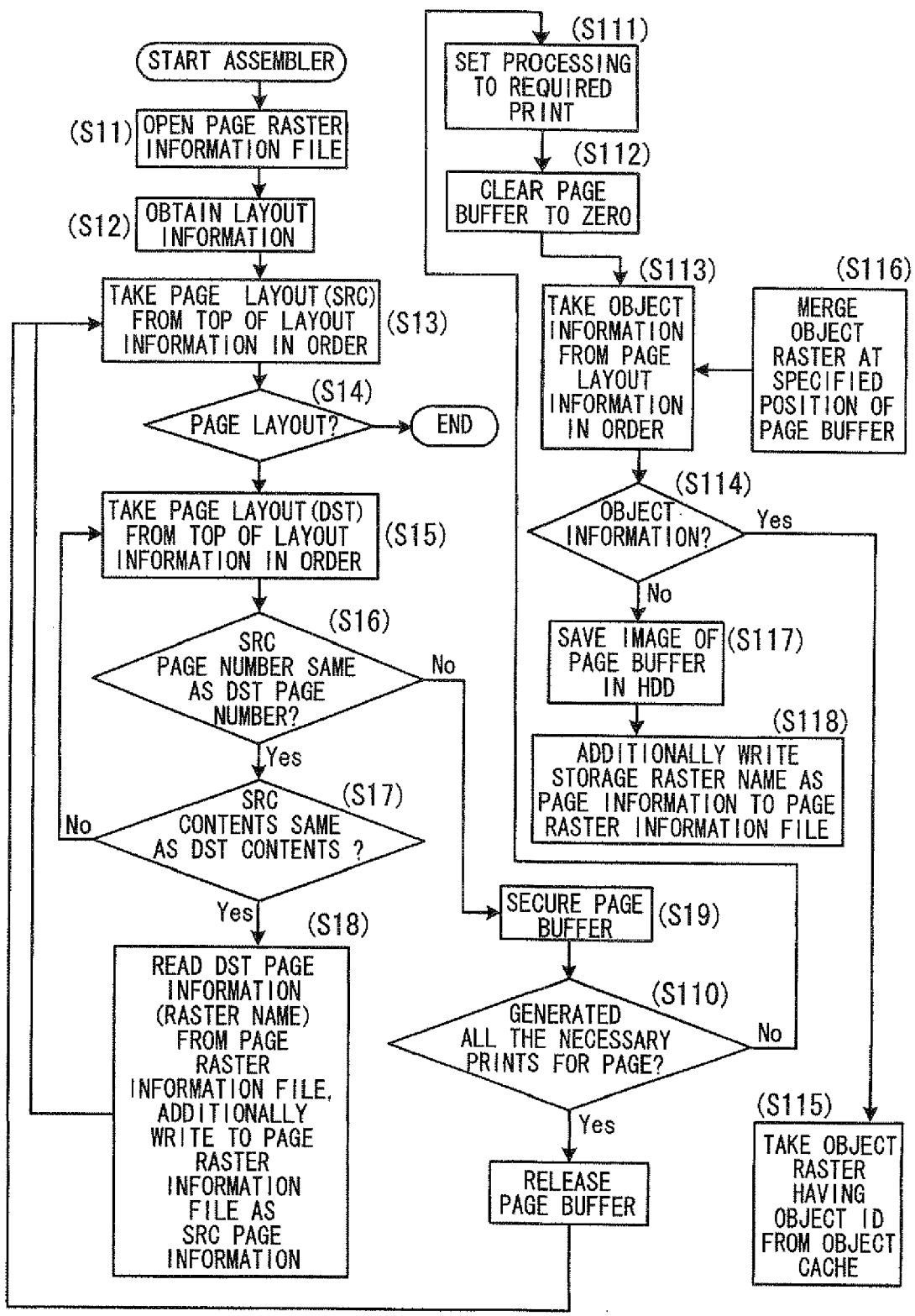
FIG. 4 is a flowchart illustrating processing in an assembler.

FIG. 4 is a flowchart illustrating processing in the assembler 14.

At first, a page raster information file is opened (step S11) followed by acquisition of layout information (step S12). Subsequently, a page layout (SRC) is retrieved sequentially from the top of the layout information (step S13). When there is any page layout (SRC) to be retrieved (step S14), a page layout (DST) is again retrieved sequentially from the top of the same page layout information (step S15). Then, it is judged if the SRC page number retrieved in step S13 is same as the DST page number retrieved in step S15. If they are different, it is judged if the contents of the SRC and the contents of the DST are the same (step S17). If the contents are not the same, the processing procedure goes back to step S15 and the next page layout (DST) is retrieved to perform similar comparison (step S16, step S17). If, in step 16, it is judged that the SRC page number is same as the DST page number, it means that there is no page layout having the same contents. Thus, a page buffer is secured (step S19), and it is judged if all the prints necessary for the page have been generated (step S110). If there is any print yet to be generated, processing of that print is set (step S111).

Specifically, the page buffer is cleared to zero (step S112) at first, and object information is retrieved from the page layout information (step S113). If there is any object information to be retrieved (step S114), an object raster having an object ID specified by the retrieved object information is taken out from the object cache 13 (step S115) and is merged at a specified position of the page buffer (step S116). This operation is repeated until there is no object information remaining in the page layout information (step S114). By doing so, a storage page raster representing an image for one page is generated on the page buffer. The image of the page buffer is saved in the HDD 15 (step S117), and a storage raster name as information of the page is additionally written to the page raster information file (step S118). An image of the page buffer is sequentially generated for all the necessary prints (for example, all the four prints in C, M, Y, and K) (step S110). When all the necessary prints are completed, the page buffer is released (step S119) and processing of the next page layout (SRC) is started (step S13).

If, in step S17, it is judged that the SRC contents is same as the DST contents, in other words, if it is judged that the contents of the current SRC is same as the contents of the DST for which a storage page raster has already been generated, a storage page raster for the current SRC is not to be generated. Instead, DST page information (a raster name) is retrieved from the page raster information file, and is additionally written to the page raster information file as information of the SRC page (step S18). Then, processing of the next page layout (SRC) is started (step S13).

When it is judged that the above processing for the last page layout is finished in step S14, processing of this assembler is completed.

Next, descriptions will be made on merging processing of an object raster.

Figure 5:
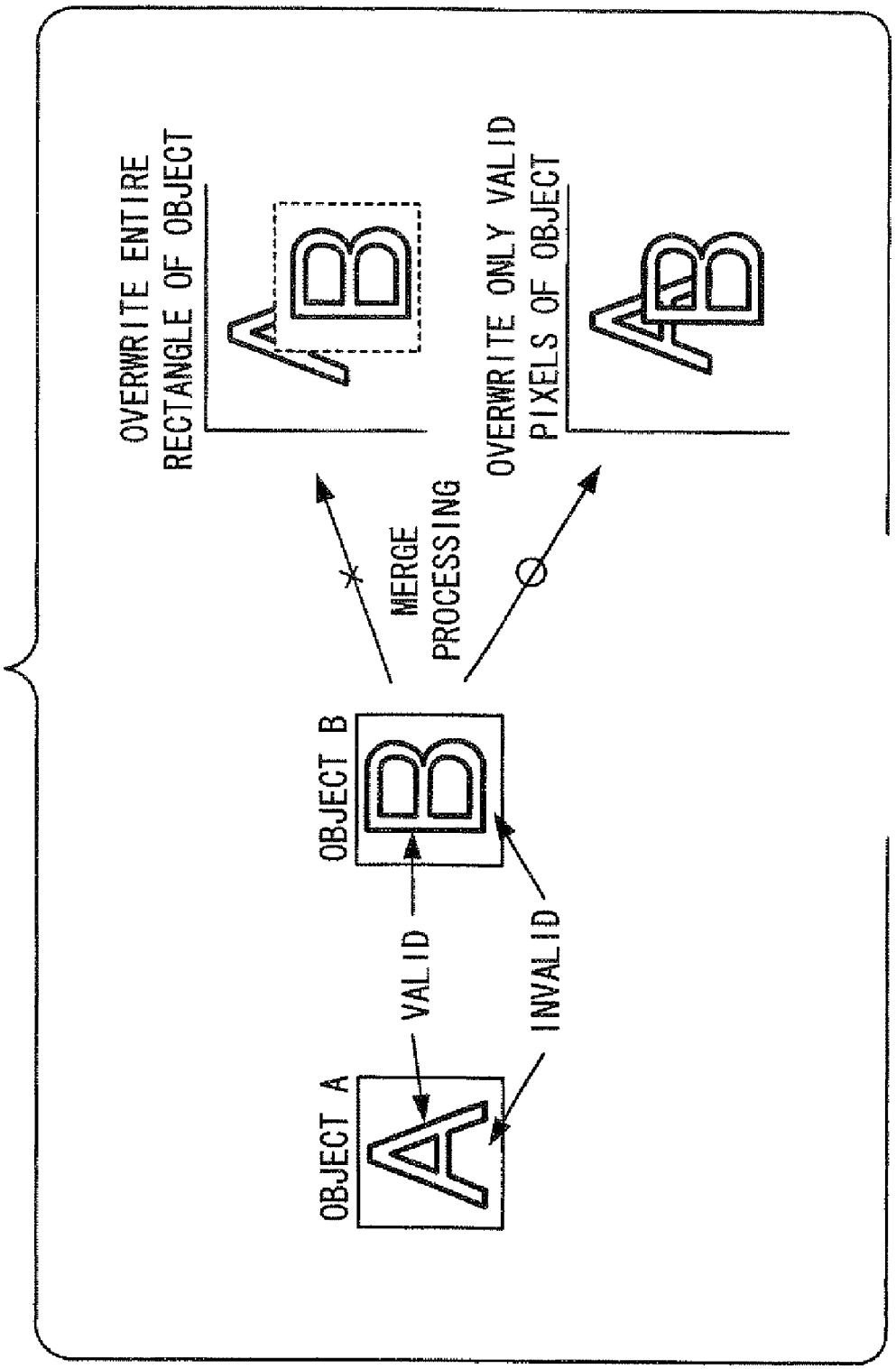
FIG. 5 is a drawing illustrating merging processing of an object raster.

FIG. 5 is a drawing illustrating merging processing of an object raster.

An object raster is a rectangular bitmap. However, the rectangular bitmap is not all valid and contains both an invalid region (pixels) and a valid region (pixels). Merge processing is a processing that the valid pixels of an object raster are written over a page buffer and no action is taken for the invalid pixels. An object raster is processed before being saved in an object cache in such a way that the pixel value≠0 indicates "validity" while the pixel value=0 indicates "invalidity." In other words, if an original pixel value=0 is valid, the object raster is processed to change the pixel value from 0 to 1 forcibly.

FIG. 5 indicates the state of a page buffer where the object raster of an object A is written on the page buffer and the object raster of an object B is written over the object A.

As shown in the right lower side of the drawing, processing of overwriting only valid pixels of the object is referred to as merge processing.

The merge processing, i.e., detecting valid pixels of the rectangular bitmap and arranging the valid pixels on a page buffer is heavy processing as it requires the heaviest usage of a CPU in the processing of an assembler.

On the other hand, processing indicated in the right upper side of FIG. 5 arranges (overwrites) all the pixels of the rectangular bitmap on the page buffer and is very light, requiring almost no usage of a CPU.

This concludes the description of the conventional variable print processing including a method disclosed in Japanese Patent Laid-Open No. 2005-210483.

Here, the amount of reusing a raster and processing amount by an assembler according to the conventional variable printing is calculated based on the case of the sample indicated in FIG. 2.

All of odd-number sheets that include variable objects and thus do not meet the conditions for reusing a raster need to be assembled. In other words, 2000 odd-number sheets among 4000 output rasters are assembled.

Even-number sheets formed only by reusable objects are capable of reusing a raster. However, there could be only a few rasters where the layout of objects in the sheet is totally identical. Based on logical calculation, the use of permutation is assumed where two layouts are randomly sampled from 20 kinds of prepared layouts in A4-size pages. Thus, probability of identical layouts in 2000 even-number sheets can be obtained by the following equation.

$$2000 \div (20 \times 19) \approx 5 \text{ (pairs)}$$

In other words, the total amount of processing by an assembler in the case of the sample job in FIG. 2 is obtained by:

$$2000 \text{ (for odd number sheets)} + (2000 - 5 \text{ (for even number sheets)}) = 3995$$

Conventionally, the amount of rasters corresponding to the result value of 3995 has been saved in the HDD 15.

Now, processing amount for reference is calculated in the case where impositioning is not applied to the sample job in FIG. 2 and there are 8000 sheets in A4 size pages.

One set is formed by four pages; the first page that includes variable objects does not meet conditions for reusing a raster. Thus, all the first pages in the sets, i.e., 2000 pages are to be assembled.

The remaining three pages (6000 pages in total) are identical with one of twenty kinds of layouts. Thus, only twenty pages are assembled as the rest of the pages are capable of reusing generated raster data.

If the total amount to be assembled is converted into an amount in A3 size, the amount is: $(2000+20) \div 2 = 1010$ (sheets) The raster data equivalent to the value of 1010 is saved in the HDD 15.

In the case of the sample job indicated in FIG. 2, the amount of assembling processing with impositioning is approximately as four times as the one without impositioning. Similarly, there is a corresponding difference between the total amount of raster data to be saved with impositioning and the one without impositioning. The embodiment according to the present invention described hereafter is capable of reducing the amount of assembling processing and the amount of raster data to be saved with impositioning as much as a job without impositioning.

Figure 6:
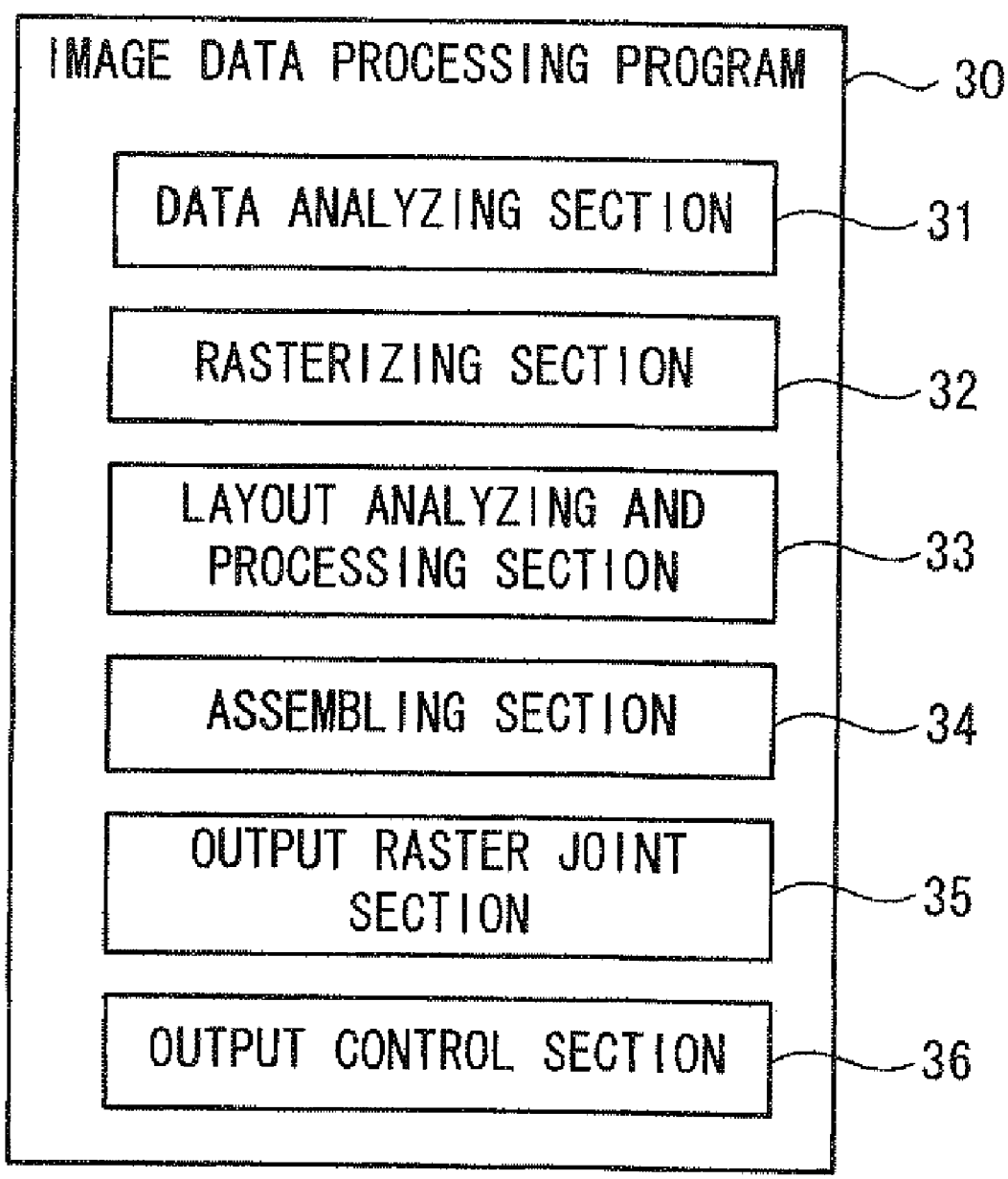
FIG. 6 indicates an outline of an image data processing program that is one embodiment of the present invention.

FIG. 6 indicates an outline of an image data processing program that is one embodiment of the present invention.

An image data processing program 30 indicated by FIG. 6 is formed by program elements including a data analyzing section 31, a rasterizing section 32, a layout analyzing and processing section 33, an assembling section 34, an output raster joint section 35, and a data output section 36.

Figure 7:
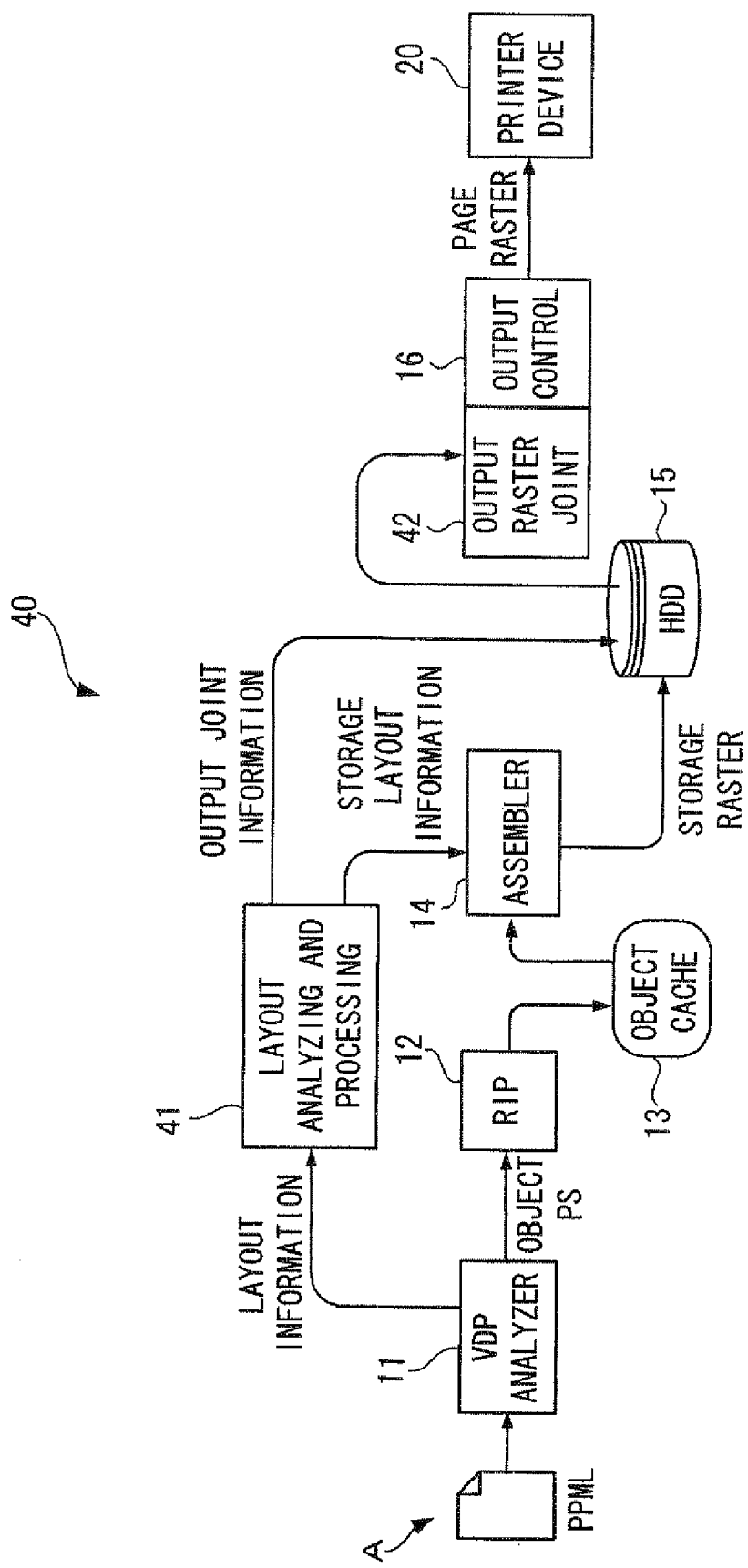
FIG. 7 is a functional block diagram of an image data processor realized in an information processing apparatus when the image data processing program 30 in FIG. 6 is executed in the information processing apparatus.

Further, FIG. 7 is a functional block diagram of an image data processor realized in an information processing apparatus for executing a program such as a computer when the image data processing program 30 in FIG. 6 is executed in the information processing apparatus.

In other words, each element indicated in FIG. 7 is a function realized by a combination of the hardware of an information processing apparatus and program elements of the image data processing program 30 indicated in FIG. 6 that are implemented in the information processing apparatus.

An image data processor 40 indicated in FIG. 7 has additional elements of a layout analyzing and processing section 41 and an output raster joint section 42 compared with those provided in the conventional image data processor 10 in FIG. 1. However, other elements of the image data processor 40 have the same functions respectively as those of the corresponding elements of the conventional image data processor 10, and thus are denoted by the same reference characters as the conventional image data processor 10 in FIG. 1.

The data analyzing section 31, which is a program element of the image data processing program 30 indicated in FIG. 6, receives PPML data A when executed in an information processing apparatus, and generates object data formed by image objects specified by the PPML data A and layout information for arrangement positions by page of the image objects specified by the PPML data A. In other words, the data analyzing section 31 is a program element that realizes the VDP analyzer 11 indicated in FIG. 7.

In addition, the rasterizing section 32 of the image data processing program 30 receives, when executed in an information processing apparatus, object data generated in the data analyzing section 31, rasterizes each image object in the received object data and thereby generates each object raster that is object data in a rasterized format of each image object. In other words, the rasterizing section 32 is a program element realizing the RIP 12 indicated in FIG. 7.

In addition, the layout analyzing and processing section 33 of the image data processing program 30, when executed in an information processing apparatus, performs: impositioning judgment processing in which it is judged if there is an image object to be arranged crossing an impositioning border, based on the layout information generated in the data analyzing section 31, and thereby the number of pages constituting one impositioning is judged; storage layout information generation processing in which a layout for each page constituting the layout information is broken into as many storage page layouts as the number of pages constituting one impositioning that is judged by the impositioning judgment processing, based on the layout information, and thereby storage layout information formed by storage page layouts for all the pages is generated; and output joint information generation processing in which each storage page layout constituting the storage layout information that is generated by the storage layout information generation processing is recorded for the number of pages constituting one impositioning judged by the impositioning judgment processing, according to a layout for each page constituting the layout information generated in the data analyzing section 31, output page joint information representing an image same as an image indicated by the layout for each page constituting the layout information is generated for all the pages, and thereby output joint information formed by the output page joint information for all the pages is generated.

The layout analyzing and processing section 33 generates storage layout information defining a page size for one page that is formed by dividing a page size defined in the layout information generated in the data analyzing section, by the number of pages constituting one impositioning that is judged by the impositioning judgment processing. In addition, the layout analyzing and processing section 33 changes, based on each page layout constituting the layout information generated in the data analyzing section 31, an arrangement position of an image for one page constituting one impositioning represented by each storage page layout constituting the storage layout information so that the changed arrangement position represents an image same as an image represented by each page layout constituting the layout information, records the storage page layout for the number of pages constituting one impositioning that is judged by the impositioning judgment processing, and thereby generates the output page joint information.

The layout analyzing and processing section 33 is a program element realizing the layout analyzing and processing section 41 indicated in FIG. 7.

Further, the assembling section 34 of the image data processing program 30, when executed in an information processing apparatus, assembles each object raster generated in the rasterizing section 32 based on the storage layout information generated in the layout processing section 33 by each storage page layout constituting the storage layout information, and generates a storage page raster indicating a rasterized image so as to avoid generation of the same storage page rasters.

The assembling section 34 is a program element realizing the assembler 14 indicated in FIG. 7.

Here, data format of the storage layout information generated in the layout analyzing and processing section 33 (layout analyzing and processing section 44) is same as that of layout information generated in the data analyzing section 31 (the VDP analyzer 11). Thus, the assembler 14 indicated in FIG. 7 has the same function as the assembler 14 indicated in FIG. 1.

Furthermore, the output raster joint section 35 of the image data processing program 30, when executed in an information processing apparatus, joins storage page rasters generated in the assembling section 34 based on output joint information by each output page joint information constituting the output joint information. Thus, the output raster joint section 35 has a function of generating the output page raster representing a rasterized image, by each output page specified by each of output joint information. In other words, the output raster joint section 35 is a program element realizing the output raster joint section 42 indicated in FIG. 7.

Furthermore, when executed in an image processing apparatus, the data output section 36 of the image data processing program 30 outputs the output page raster generated in the output raster joint section 35 to a printer device 20. The data output section 36 is a program element realizing the output control section 16 indicated in FIG. 7.

In the following, each element of the image data processor 40 indicated in FIG. 7 will be described focusing on elements added to those of the conventional image data processor 10 indicated in FIG. 1. The sample job in FIG. 2 and layout information of the sample job indicated in FIG. 3 are referred to also in this embodiment.

The image data processor 40 indicated in FIG. 7 that is an embodiment of the present invention has additional two elements of the layout analyzing and processing section 41 and the output raster joint section 42 in comparison to the conventional image data processor 10 in FIG. 1, thereby realizing reduction in the amount of assembling processing and storage data in the HDD 15.

In the case of the sample job indicated in FIG. 2, a raster image where two pages are imposed on a sheet of A3 size is divided into raster images having A4 size without impositioning, which enables reduction in the amount of raster data to be saved in the HDD 15 and in the amount of assembling processing that is heaviest processing in variable printing.

According to the present embodiment, an imposed image is divided into images without impositioning by adding the following processing, followed by the operation of an assembler.

I. Analyze layout information to judge if an image is imposed.

Here, it is judged if one, two, four, six or eight pages are imposed on one sheet (hereafter referred to as one page, two pages, four pages, six pages or eight pages impositioning, and details will be described later).

One page-impositioning represents an image where pages are not imposed.

II. Generate layout information (storage layout information) before impositioning according to the impositioning judgment.

III. Generate layout information (output joint information) for creating an imposed output page raster from a storage raster without impositioning according to the impositioning judgment.

IV. Execute the assembler using the storage layout information.

V. Combine images using output joint information in the output raster joint section 42 and send the generated page raster to the printer device 20.

Figure 8:
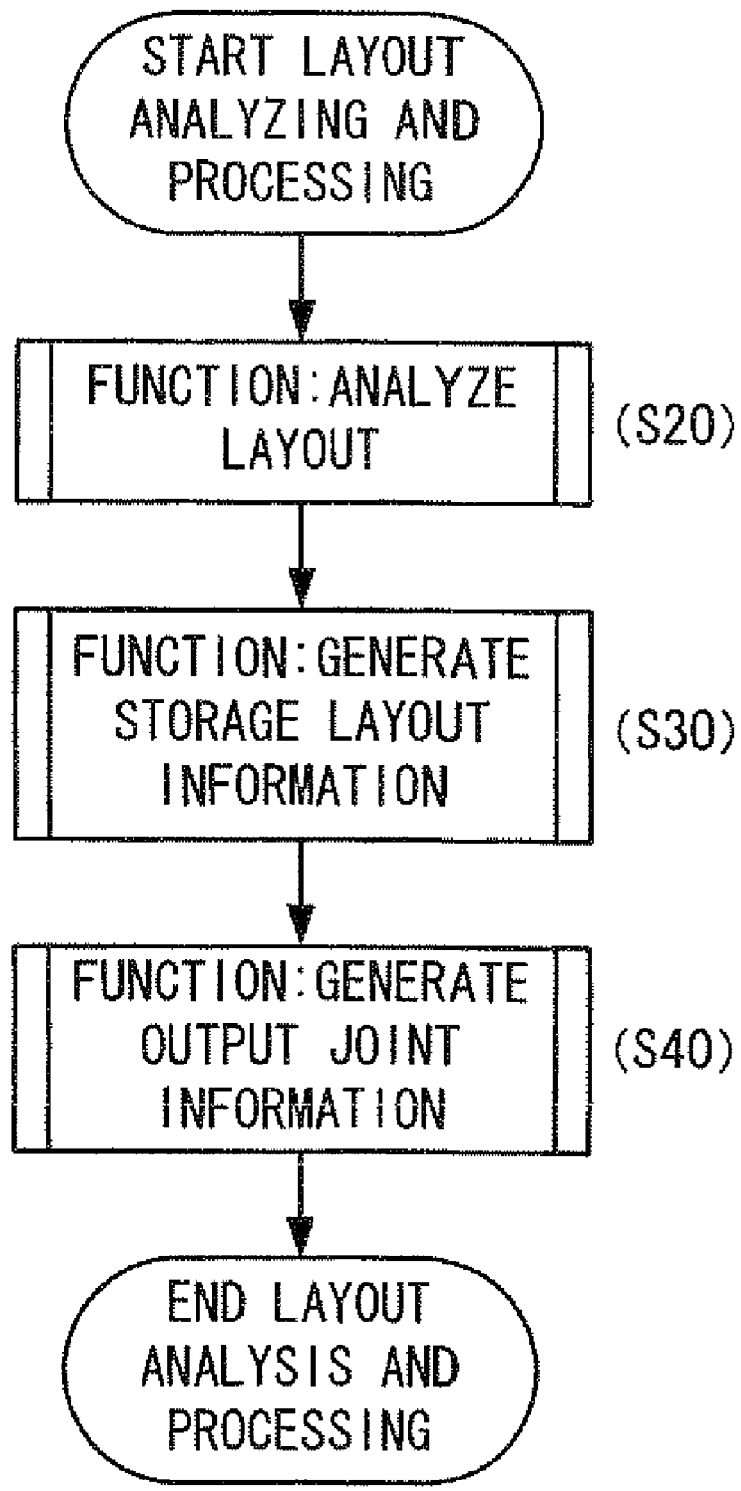
FIG. 8 is a flowchart illustrating processing in a layout analyzing and processing section.

FIG. 8 is a flowchart illustrating processing in the layout analyzing and processing section 41 where processing of analyzing a layout (step S20), generating storage layout information (step S30), and generating output joint information (step S40) are performed.

Figure 9:
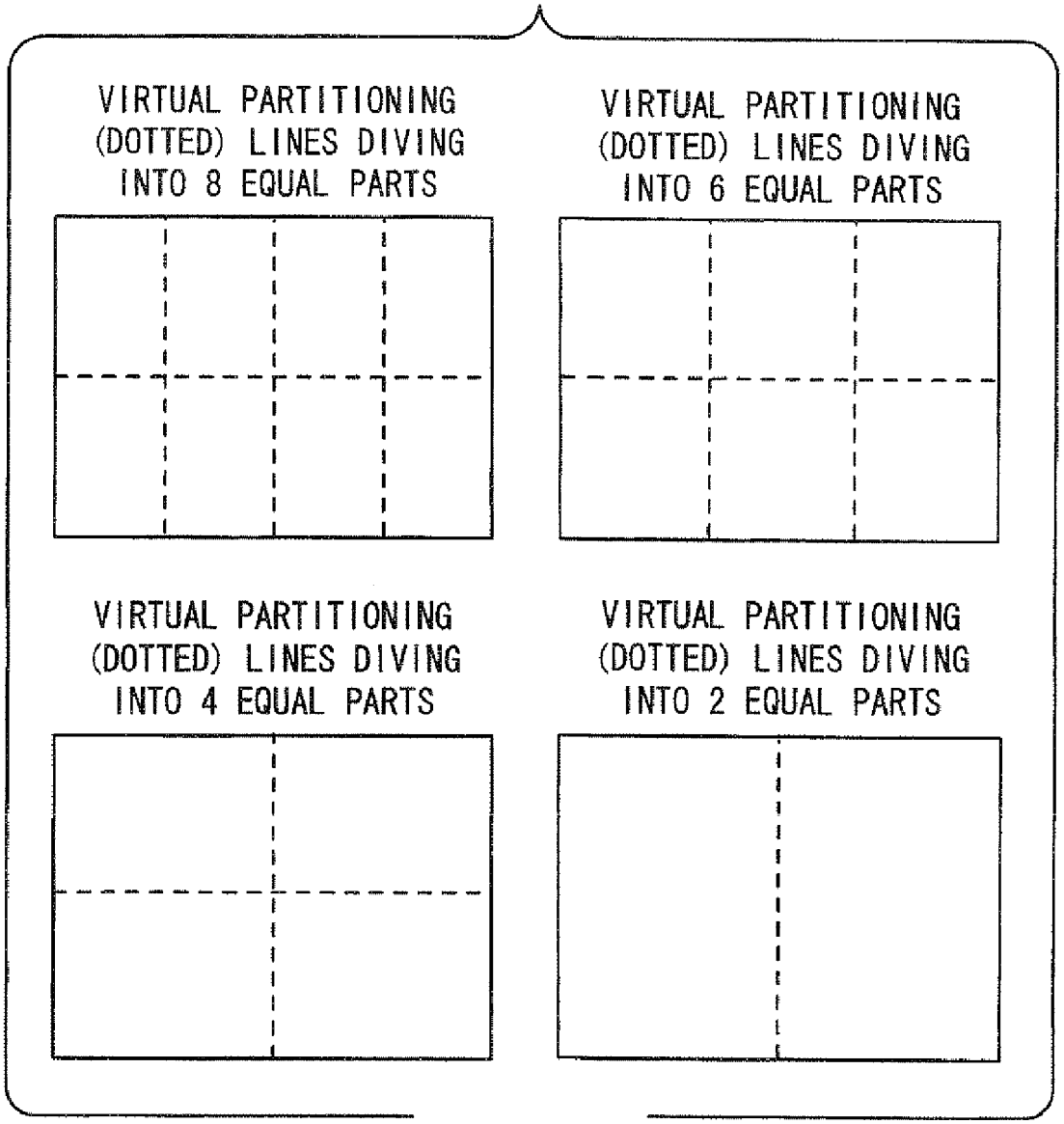
FIG. 9 is a conceptual drawing illustrating virtual partitioning lines in layout analyzing processing.

FIG. 9 is a conceptual drawing illustrating virtual partitioning lines in the layout analyzing processing. FIG. 9 shows virtual partitioning lines in the case of horizontally-oriented sheets. Vertically-oriented sheets would have virtual partitioning lines indicated in FIG. 9 rotated by 90 degrees.

In the layout analyzing processing (step S20), layout information is analyzed to judge if a layout has two page-, four page-, six page-, or eight page-impositioning. If the layout does not have plural pages imposed, it is judged that the layout has one page impositioning.

Here, it is assumed that there are virtual partitioning lines for partitioning an output page raster into two, four, six, and eight equal parts. Based on arrangement positions of objects in layout information it is judged if there is any object crossing a virtual partitioning line. If arrangement positions of an object cross a virtual partitioning line, it is judged that impositioning is not applied to the sheet.

Figure 10:
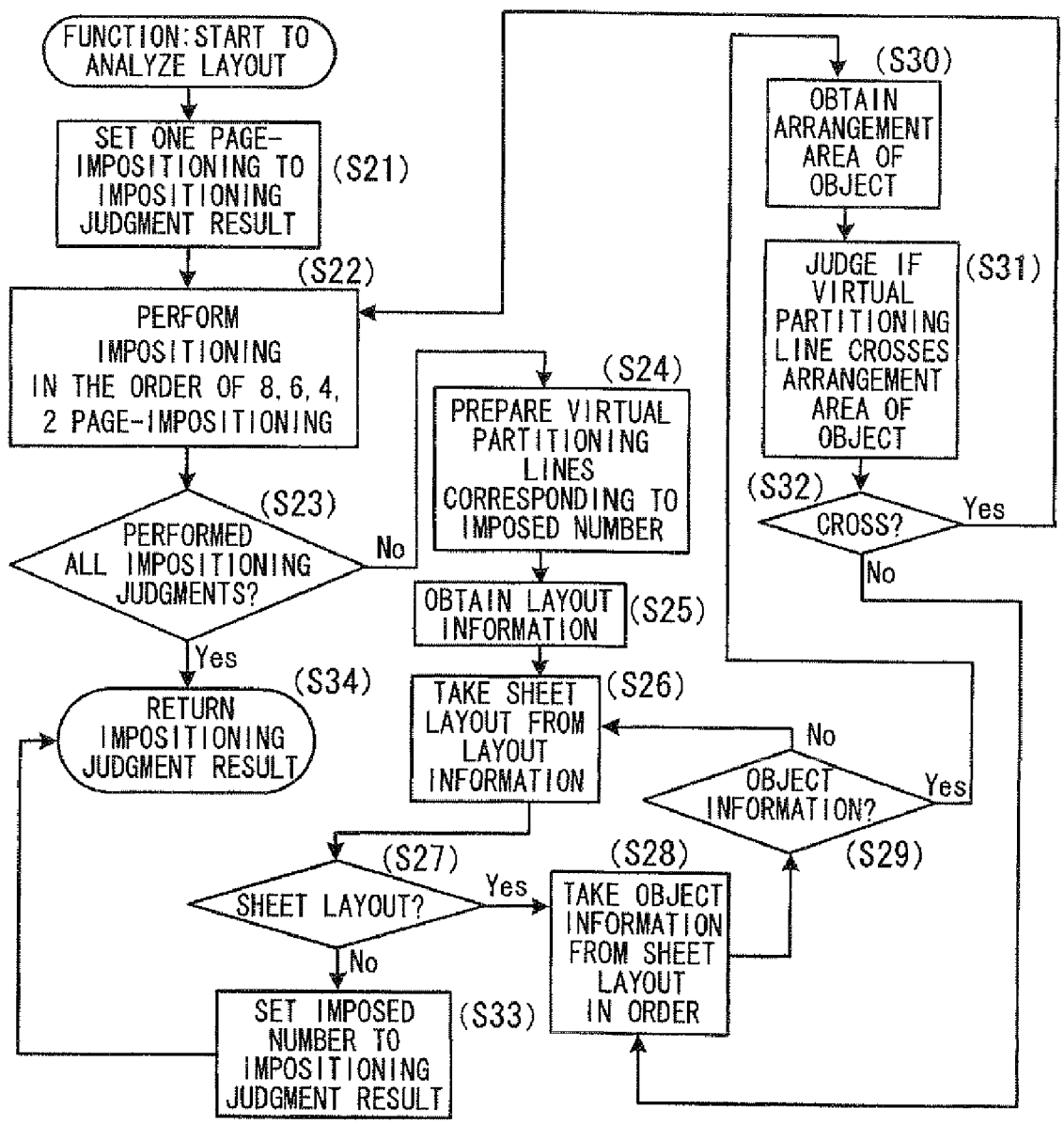
FIG. 10 is a flowchart showing a detailed flow of the layout analyzing processing.

FIG. 10 is a flowchart showing a detailed flow of the layout analyzing processing (step S20 of FIG. 8).

At first, one page-impositioning is set to a result of impositioning judgment, i.e., judgment on the number of pages imposed on a sheet (step S21). Subsequently, impositioning judgment is performed sequentially in the order of 8 page-, 6 page-, 4 page-, and 2 page-impositioning (step S22). If it is not the case where every impositioning judgment (for all of 8 page-, 6 page-, 4 page-, and 2 page-impositioning) are performed (step S23), virtual partitioning lines corresponding to the number of pages imposed on a sheet are prepared (step S24) and layout information is acquired (step S25). Then, a sheet layout is retrieved from the acquired layout information (step S26). If there is any sheet layout to be retrieved (step S27), object information is sequentially retrieved from the sheet layout (step S28). When object information is retrieved from the sheet layout (step S29), an arrangement area specified by the object information is obtained (step S30). Then, it is judged if each virtual partitioning line crosses the arrangement area of the object (step S31). When it is judged that each virtual partitioning line crosses the arrangement area of the object, impositioning analysis for the current number-impositioning is ended (step S32) and the procedure goes back to step S22 where analysis for the next smaller number-impositioning is started.

If it is judged in step S32 that each virtual partitioning line does not cross the arrangement area of the object, the next object information is retrieved from the sheet layout (step S28) to repeat the similar judgment. When there is no unprocessed object information to be retrieved from the sheet layout (step S29), the next sheet layout is retrieved from layout information (step S26). For each of object information on the newly retrieved sheet layout, it is judged if the arrangement area of each object crosses each virtual partitioning line.

If all the objects on all the sheet layouts constituting the layout information do not cross virtual partitioning lines (step S27), the number of impositioning currently analyzed is set to a result of impositioning judgment (step S33). Then, the result of impositioning judgment is sent to the main flow of processing in FIG. 8. This concludes the flow of this layout analysis (step S34).

When the impositioning judgment is performed entirely in the order of 8 page-, 6 page-, 4 page-, and 2 page-impositioning, if there are image objects that cross virtual partitioning lines (step S23), a single-impositioning as a result of impositioning judgment that has been set as a default in step S21 is sent back to the main flow of processing (step S34).

The sample job having a sheet layout of FIG. 2 is judged to be 2 page-impositioning according to the processing indicated in FIG. 10.

Next, processing of storage layout information in FIG. 8 (step S30) will be described.

Figure 11:
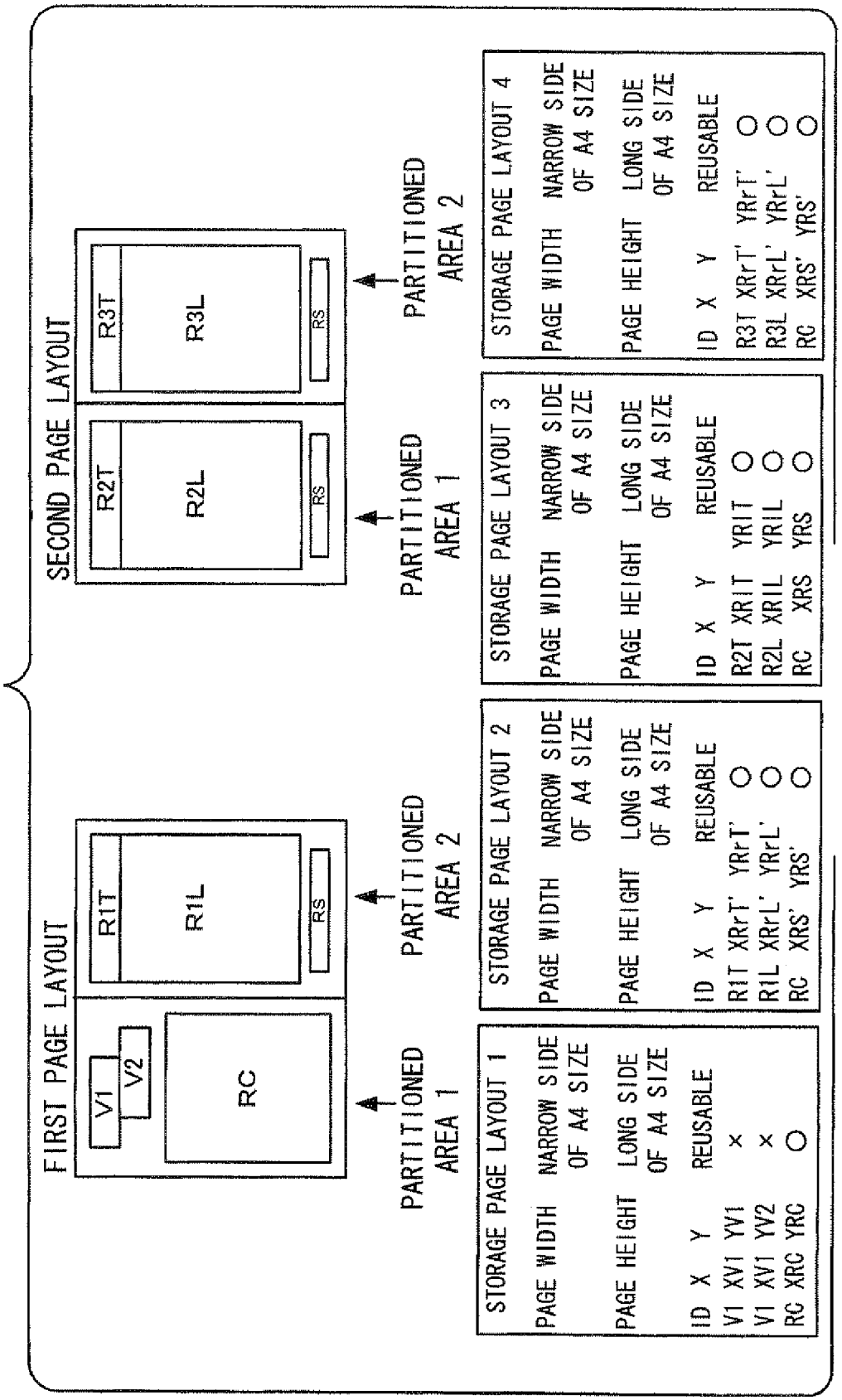
FIG. 11 indicates a first page and a second page of storage page layouts included in storage layout information that is generated for the sample job indicated in FIG. 2.

FIG. 11 indicates the first page and the second page of storage page layouts included in storage layout information that is generated for the sample job indicated in FIG. 2.

The sample job in FIG. 2 has 2-page impositioning. When each sheet is partitioned into right-left two pages, a storage page layout for each page is generated.

Figure 12:
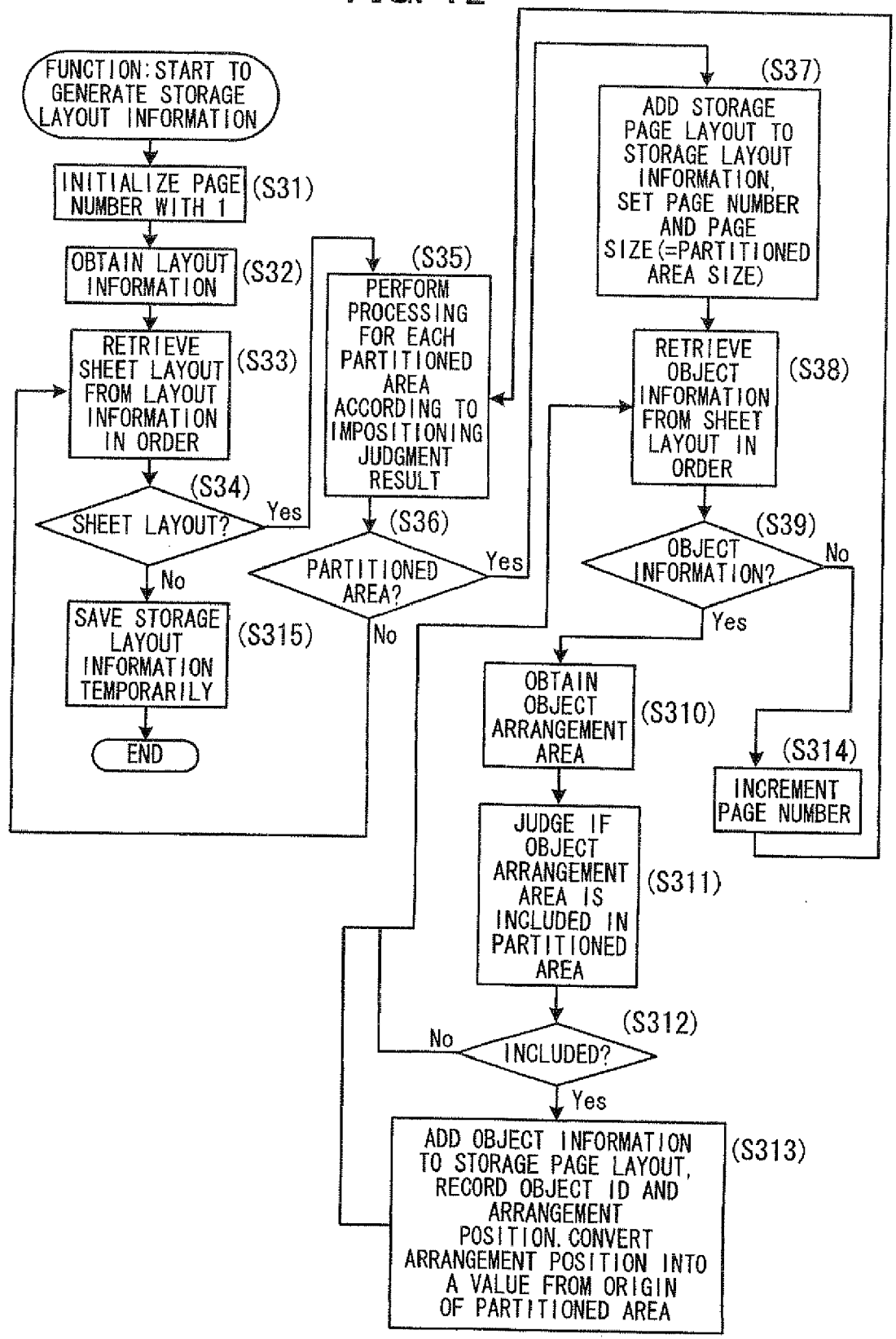
FIG. 12 is a flowchart showing a detailed flow of processing of generating storage layout information.

FIG. 12 is a flowchart showing a detailed flow of processing of generating storage layout information (step S30 of FIG. 10).

Here, at first, a page number is initialized with 1 (step S31) and storage layout information is obtained (step S32). Then, a sheet layout is retrieved sequentially from the obtained storage layout information (step S33). If there is a sheet layout to be retrieved (step S34), the following processing will be performed for each of partitioned areas having the partitioned number in accordance with the result of impositioning judgment (step S35). In other words, if there is any unprocessed partitioned area (step S36), a storage page layout is added to storage layout information and a page number and the size of the page (the size of the partitioned area) is set (step S37). Subsequently, object information is sequentially retrieved from the sheet layout (step S38). When there is object information (step S39), an arrangement area of the relevant object on the sheet is obtained for each object information (step S310). Then, it is judged if the arrangement area of the object is included in the current partitioned area (step S311, step S312). If not, the processing goes back to step S38 and the next object information is retrieved to repeat the same processing. If it is judged that the arrangement area of the object is included in the current partitioned area, the object information is added to the storage page layout and the object ID and its arrangement position is recorded. However, it should be noted that the arrangement position to be recorded is not a value from the origin of the original sheet, but a value converted into a value from the origin of the partitioned area (step S313). Subsequently, the processing goes back to step S38 to apply similar processing to the next object information.

If there is no object information yet to be retrieved from the sheet layout (step S39), the page number is incremented (step S314). If there is an unprocessed partitioned area (step S36), the similar processing is applied to the next unprocessed partitioned area. When there is no unprocessed partitioned area on the current sheet layout (step S36), the processing goes back to step S33 and the next sheet layout is retrieved from layout information to repeat the similar processing.

If there is no unprocessed layout (step S34), storage layout information formed by all the storage layouts generated in a series of processing described above is temporarily saved (step 5315) to finish the processing of generating storage layout information.

A series of processing described above generates storage layout information formed by all the pages having storage page layouts indicated in FIG. 11.

Next, processing of generating output joint information indicated in FIG. 8 (step S40) is described.

Figure 13:
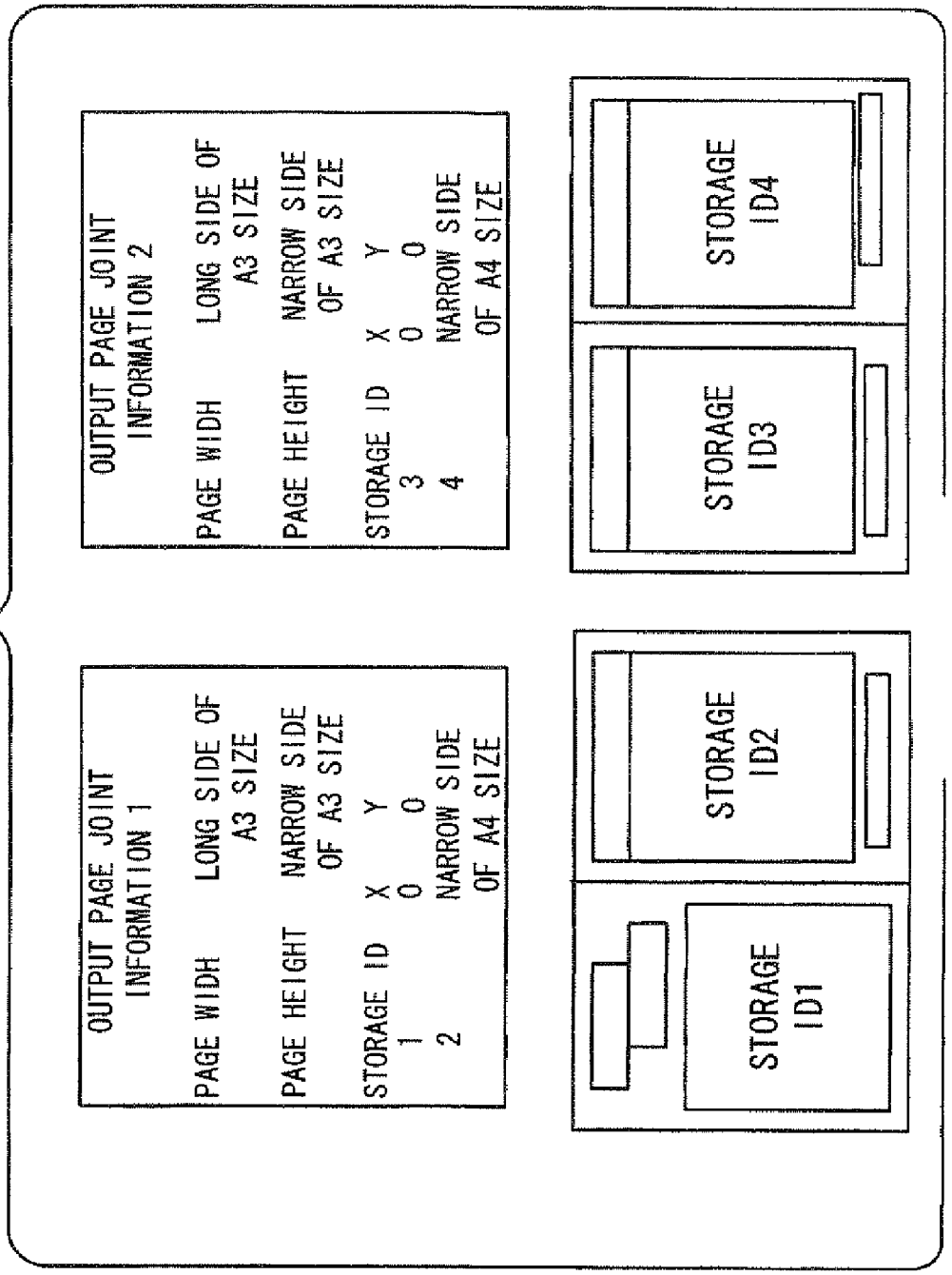
FIG. 13 is a conceptual diagram of output page joint information constituting output joint information.

FIG. 13 is a conceptual diagram of output page joint information constituting output joint information. "Storage ID" is an ID of a storage page layout as indicated in FIG. 11. (X, Y) represents the origin of the arrangement position of an image represented by the storage page layout. The example in FIG. 13 has two page-impositioning where images of storage IDs 1 and 2 are arranged respectively on the left half and right half of the first sheet. Similarly, images of storage IDs 3 and 4 are arranged respectively on the left half and right half of the second sheet.

Figure 14:
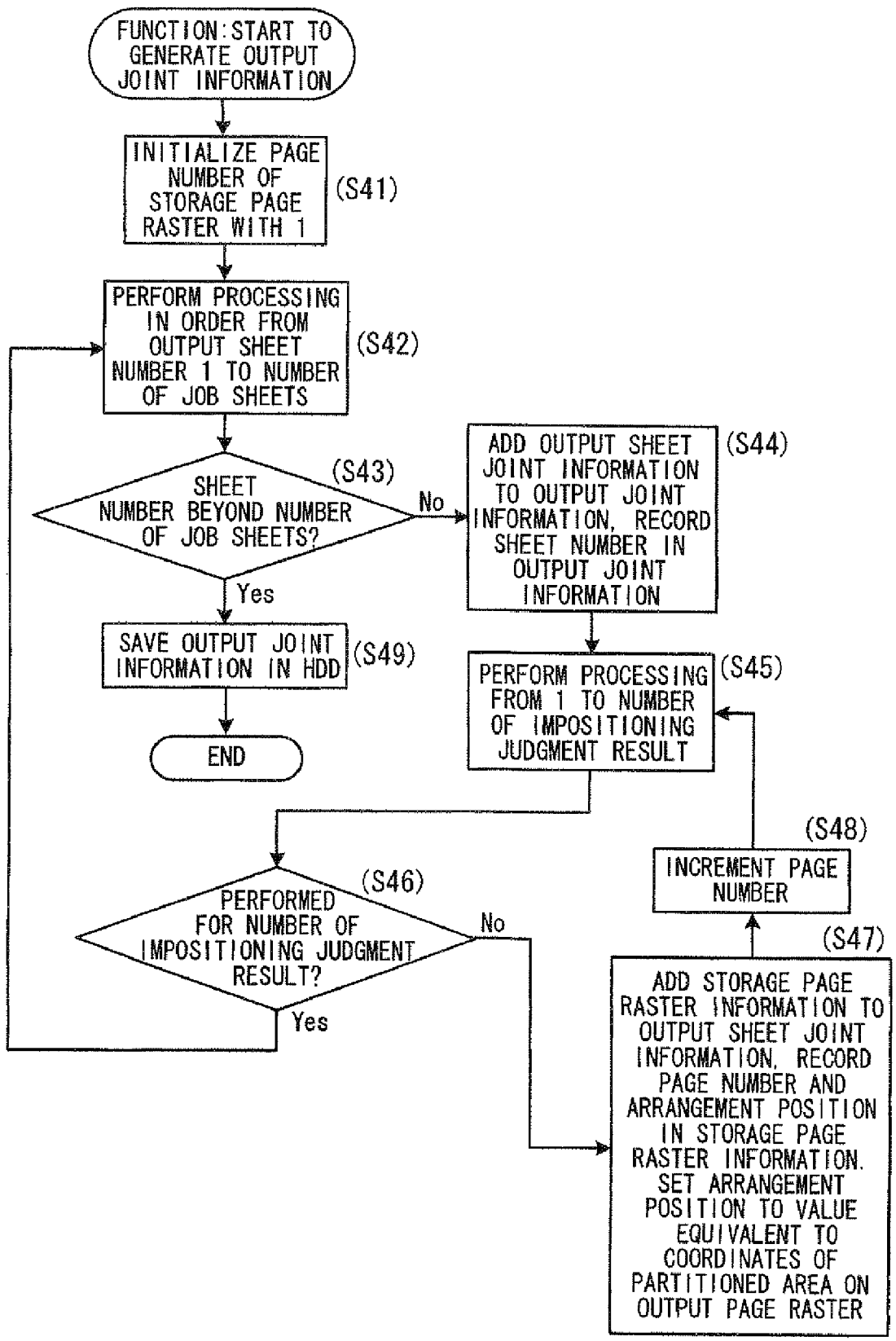
FIG. 14 is a flowchart showing a detailed flow of processing of generating output joint information.

FIG. 14 is a flowchart showing a detailed flow of processing of generating output joint information (step S40 of FIG. 8).

At first, a page number of the storage raster is initialized with 1 (step S41) and the following processing is performed sequentially from the output sheet number 1 to the number of sheets in the current job (step S42). When the sheet number do not exceed the number of the sheets of the job (step S43), output sheet joint information is added to output joint information, the sheet number is recorded in the output joint information (step S44). Then, the following processing is performed sequentially from 1 to the number of impositioning judgment result (step S45). When the processing is not performed for the number of impositioning judgment result (step S46), storage page raster information is added to output sheet joint information and a page number and the arrangement position is recorded in the storage page raster information. It should be noted that the arrangement position to be recorded is a value equivalent to the coordinates of the partitioned area on the output page raster (step S47). Then, the page number of the storage page rater is incremented (step S48), processing is repeated for the number of impositioning judgment result (the number of impositioning judgment result of the sample job (2-page impositioning)=2) (step S46), the output sheet number is incremented by one (step S42) and the similar processing is repeated. When the similar processing is repeated for the number of the sheets of the job (step S43), output joint information formed by all the output sheet joint information generated by a series of the current processing is saved in the HDD 15 (step S49). This concludes processing of generating output joint information.

The processing described above generates output joint information formed by output sheet joint information of all the sheets indicated in FIG. 13.

Figure 15:
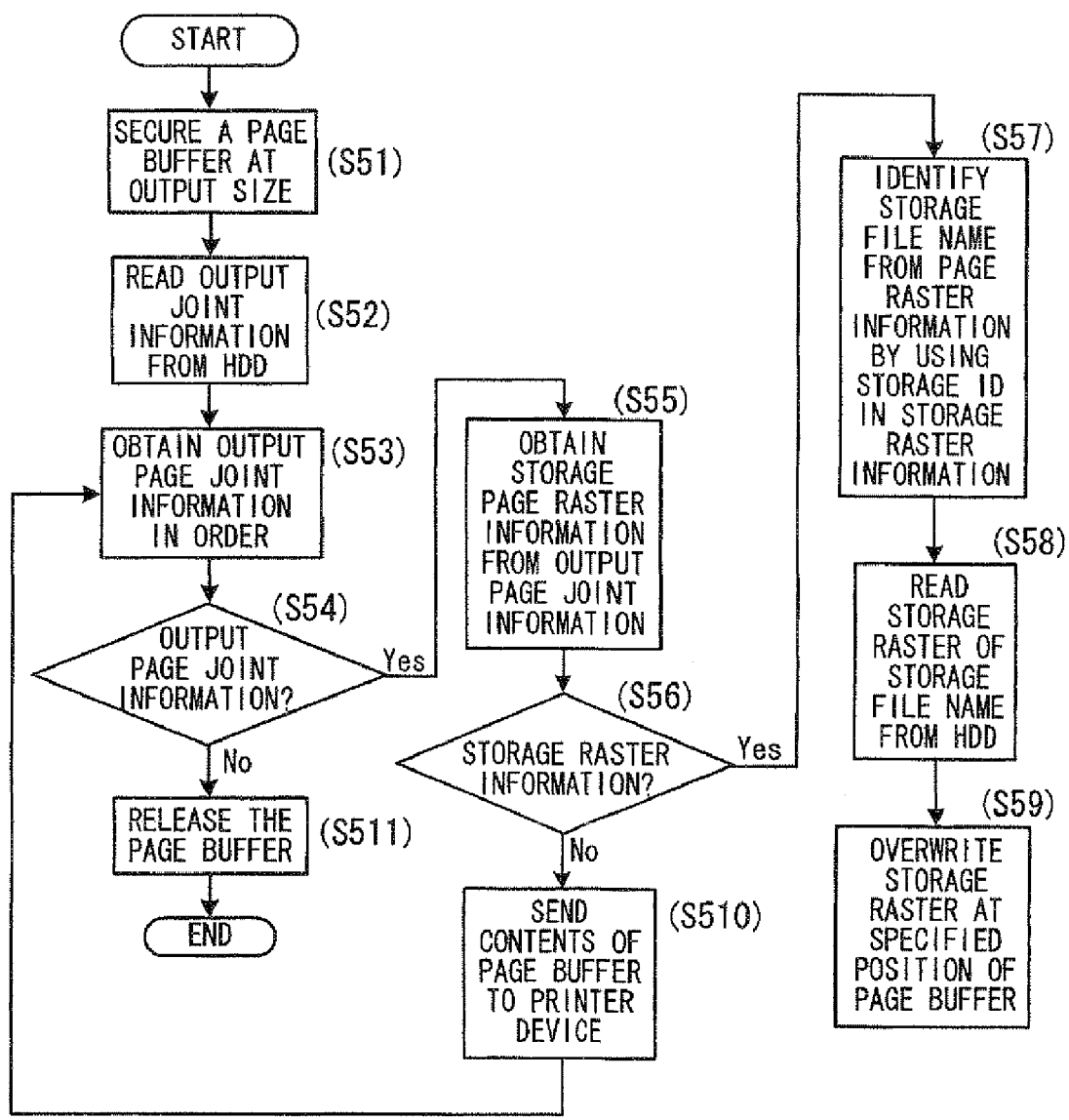
FIG. 15 is a flowchart representing processing of an output raster joint section and an output control section in FIG. 7.

FIG. 15 is a flowchart representing processing of the output raster joint section 42 and the output control section 16 in FIG. 7.

At first, a page buffer of output size is secured (step S51), output joint information is read from the HDD 15 (step S52), and output page joint information constituting the output joint information is obtained in order to perform the following processing (step S53). When there is unprocessed output page joint information (step S54), storage raster information is obtained sequentially from the currently-obtained output page joint information (step S55). When there is storage raster information to be obtained, a storage file name is identified and retrieved from page raster information by using the relevant ID in the storage raster information (step S57). The storage raster having the storage file name is read from the HDD 15 (step S58), the storage raster is written over at a specified position on the page buffer (step S59). This procedure is repeated until there is no unprocessed storage raster information left in the output page joint information (step S56). Then, the contents of the page buffer is sent to the printer device 20 (step S510) and processing of the next output page joint information is started (step S53). When there is no unprocessed output page joint information (step S54), the page buffer is released (step S511) to finish the processing.

By performing processing indicated in FIG. 15, raster data for every sheet with impositioning that have been described in the original PPML data A is sent to the printer device 20 where a visible image with impositioning is printed out.

What is claimed is:

1. An image data processor comprising:
   a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having arrangement positions by each page of the image objects specified by the page description data;
   a rasterizing section that receives the object data generated in the data analyzing section and rasterizes each image object in the object data, thereby generates an object raster that is object data in a rasterized format of each image object;
   a layout analyzing and processing section that performs:
      impositioning judgment processing in which it is judged if there is an image object to be arranged crossing an impositioning border, based on the layout information generated in the data analyzing section, and thereby the number of pages constituting one impositioning is judged;
      storage layout information generation processing in which a layout for each page constituting the layout information is broken into as many storage page layouts as the number of pages constituting one impositioning, said number of pages being judged by the impositioning judgment processing, based on the layout information generated in the data analyzing section, and thereby storage layout information formed by storage page layouts for all the pages is generated; and
      output joint information generation processing in which each storage page layout constituting the storage layout information that is generated by the storage layout information generation processing is recorded for the number of pages constituting one impositioning, said number of pages being judged by the impositioning judgment processing, according to a layout for each page constituting the layout information generated in the data analyzing section, output page joint information representing an image same as an image indicated by the layout for each page constituting the layout information is generated for all the pages, and thereby output joint information formed by the output page joint information for all the pages is generated;
   an assembling section that assembles each object raster generated in the rasterizing section, based on the storage layout information generated in the layout analyzing and processing section, for each storage page layout constituting the storage layout information, thereby generating a storage page raster representing a rasterized image in a manner to avoid generation of the same storage page raster; and
   an output raster joint section that joins storage page rasters generated in the assembling section based on the output joint information by each output page joint information constituting the output joint information, thereby generating an output page raster representing a rasterized image by each output page.

2. The image data processor according to claim 1, wherein the layout analyzing and processing section generates storage layout information defining a page size for one page that is formed by dividing a page size defined in the layout information generated in the data analyzing section, by the number of pages constituting one impositioning that is judged by the impositioning judgment processing.

3. The image data processor according to claim 2, wherein the layout analyzing and processing section changes, based on each page layout constituting the layout information generated in the data analyzing section, an arrangement position of an image for one page constituting one impositioning represented by each storage page layout constituting the storage layout information so that the changed arrangement position represents an image same as an image represented by each page layout constituting the layout information, records the storage page layout for the number of pages constituting one impositioning that is judged by the impositioning judgment processing, and thereby generates the output page joint information.

4. The image data processor according to claim 1, further comprising an output control section that outputs an output page raster generated in the output raster joint section to a printer that prints a visual image based on the output page raster.

5. The image data processor according to claim 2, further comprising an output control section that outputs an output page raster generated in the output raster joint section to a printer that prints a visual image based on the output page raster.

6. The image data processor according to claim 3, further comprising an output control section that outputs an output page raster generated in the output raster joint section to a printer that prints a visual image based on the output page raster.

7. An image data processing program storage medium storing an image data processing program, which is executed in an information processing apparatus and causes the information processing apparatus to operate as an image data processor, the image data processor comprising:
- a data analyzing section that receives information specifying a reusable object that is an image object used repeatedly over a plurality of pages, information specifying a variable object that is an image object used once on a particular page, and page description data in page description language describing arrangement positions of image objects by each page formed by the reusable object and the variable object, and that generates object data having image objects specified by the page description data, and layout information having arrangement positions by each page of the image objects specified by the page description data;
- a rasterizing section that receives the object data generated in the data analyzing section and rasterizes each image object in the object data, thereby generates an object raster that is object data in a rasterized format of each image object;
- a layout analyzing and processing section that performs: impositioning judgment processing in which it is judged if there is an image object to be arranged crossing an impositioning border, based on the layout information generated in the data analyzing section, and thereby the number of pages constituting one impositioning is judged; storage layout information generation processing in which a layout for each page constituting the layout information is broken into as many storage page layouts as the number of pages constituting one impositioning, said number of pages being judged by the impositioning judgment processing, based on the layout information generated in the data analyzing section, and thereby storage layout information formed by storage page layouts for all the pages is generated; and output joint information generation processing in which each storage page layout constituting the storage layout information that is generated by the storage layout information generation processing is recorded for the number of pages constituting one impositioning, said number of pages being judged by the impositioning judgment processing, according to a layout for each page constituting the layout information generated in the data analyzing section, output page joint information representing an image same as an image indicated by the layout for each page constituting the layout information is generated for all the pages, and thereby output joint information formed by the output page joint information for all the pages is generated;
- an assembling section that assembles each object raster generated in the rasterizing section, based on the storage layout information generated in the layout analyzing and processing section, for each storage page layout constituting the storage layout information, thereby generating a storage page raster representing a rasterized image in a manner to avoid generation of the same storage page raster; and
- an output raster joint section that joins storage page rasters generated in the assembling section based on the output joint information by each output page joint information constituting the output joint information, thereby generating an output page raster representing a rasterized image by each output page.

8. The image data processing program storage medium according to claim 7, wherein the layout analyzing and processing section generates storage layout information defining a page size for one page that is formed by dividing a page size defined in the layout information generated in the data analyzing section, by the number of pages constituting one impositioning that is judged by the impositioning judgment processing.

9. The image data processing program storage medium according to claim 8, wherein the layout analyzing and processing section changes, based on each page layout constituting the layout information generated in the data analyzing section, an arrangement position of an image for one page constituting one impositioning represented by each storage page layout constituting the storage layout information so that the changed arrangement position represents an image same as an image represented by each page layout constituting the layout information, records the storage page layout for the number of pages constituting one impositioning that is judged by the impositioning judgment processing, and thereby generates the output page joint information.

10. The image data processing program storage medium according to claim 7, wherein the image data processor further comprises an output control section that outputs an output page raster generated in the output raster joint section to a printer that prints a visual image based on the output page raster.

11. The image data processing program storage medium according to claim 8, wherein the image data processor further comprises an output control section that outputs an output page raster generated in the output raster joint section to a printer that prints a visual image based on the output page raster.

12. The image data processing program storage medium according to claim 9, wherein the image data processor further comprises an output control section that outputs an output page raster generated in the output raster joint section to a printer that prints a visual image based on the output page raster.

* * * * *